Oct. 11, 1960  R. B. MALLEY  2,955,487
SPEED REDUCER
Filed Dec. 19, 1957  2 Sheets-Sheet 1

INVENTOR
RAYMOND B. MALLEY
BY
ATTORNEYS

Oct. 11, 1960 R. B. MALLEY 2,955,487
SPEED REDUCER
Filed Dec. 19, 1957 2 Sheets-Sheet 2
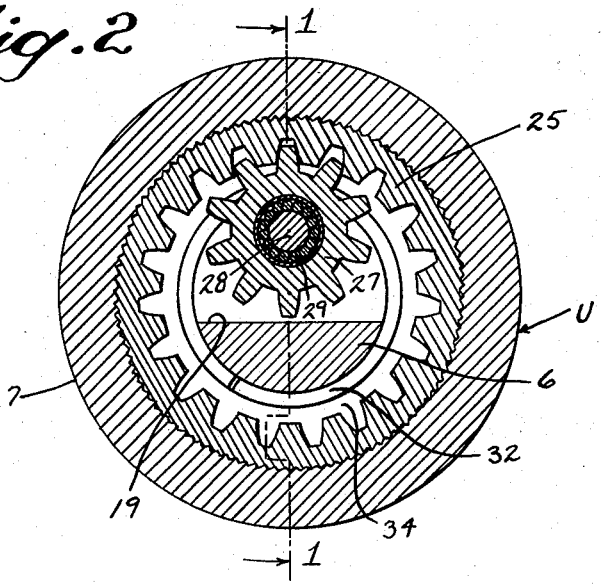
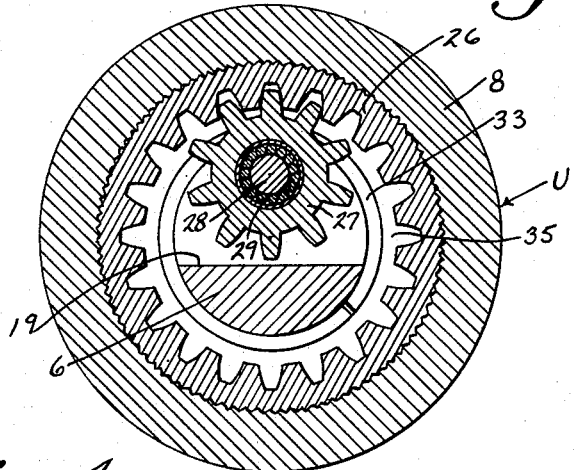
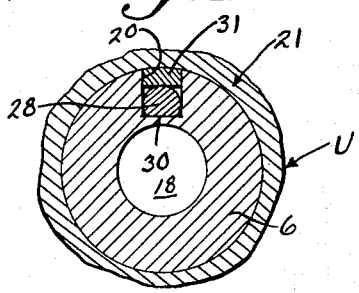
INVENTOR
RAYMOND B. MALLEY
BY
ATTORNEYS United States Patent Office 2,955,487
Patented Oct. 11, 1960

2,955,487

SPEED REDUCER

Raymond B. Malley, 500 E. Ogden Ave., Milwaukee, Wis.

Filed Dec. 19, 1957, Ser. No. 703,893

9 Claims. (Cl. 74—803)

This invention appertains to the transmission of power and more particularly to a novel speed reduction gearing, construction, arrangement and combination of its parts.

This speed reduction gearing functions between a source of power, such as a motor, machine, etc., and a tool or driven member that is to be driven at a reduced speed. Less power can then be used to do work, also a low rotary speed is necessary for many operations, such as drilling, reaming, milling, cutting, etc., and where frictional heat induced to the part by these machining operations is a problem.

One of the primary objects of my invention is to provide an in-line speed reduction unit of a compact and rugged design and one in which the parts are concentrically related, so that the unit will be statically and dynamically balanced.

Another salient object of my invention is to provide an in-line reduction unit of such a compact design that the same can be effectively used between a drive shaft spindle socket such as in a drill press, and the tool to be driven, the unit being particularly useful in connection with lathes, milling machines, etc., or anywhere in which the reduction of rotary speed is desirable.

A further important object of my invention is to provide a light in weight and completely portable speed reduction unit which can be placed in-line between a portable electric drill shaft and the tool or the like to be driven.

Another object of my invention is to provide a speed reduction unit with two separate relative drives for rotary power at reduced speeds.

A still further object of my invention is to provide a speed reduction unit embodying construction features essential for better alignment for efficient functioning of its parts.

A still further important object of my invention is the provision of means for sealing the bearing compartments from the gear compartment of the unit, whereby each of the compartments will effectively retain its desired type of lubricant when unit is installed in various positions.

Further objects, advantages and understanding of my invention will appear as the specification proceeds.

In the drawings:

Figure 2 is a diametrical sectional view taken through the unit on the line 2—2 of Figure 1, looking in the direction of the arrows, the view illustrating more particularly the front annular gear and the pinion meshing therewith;

Figure 1:
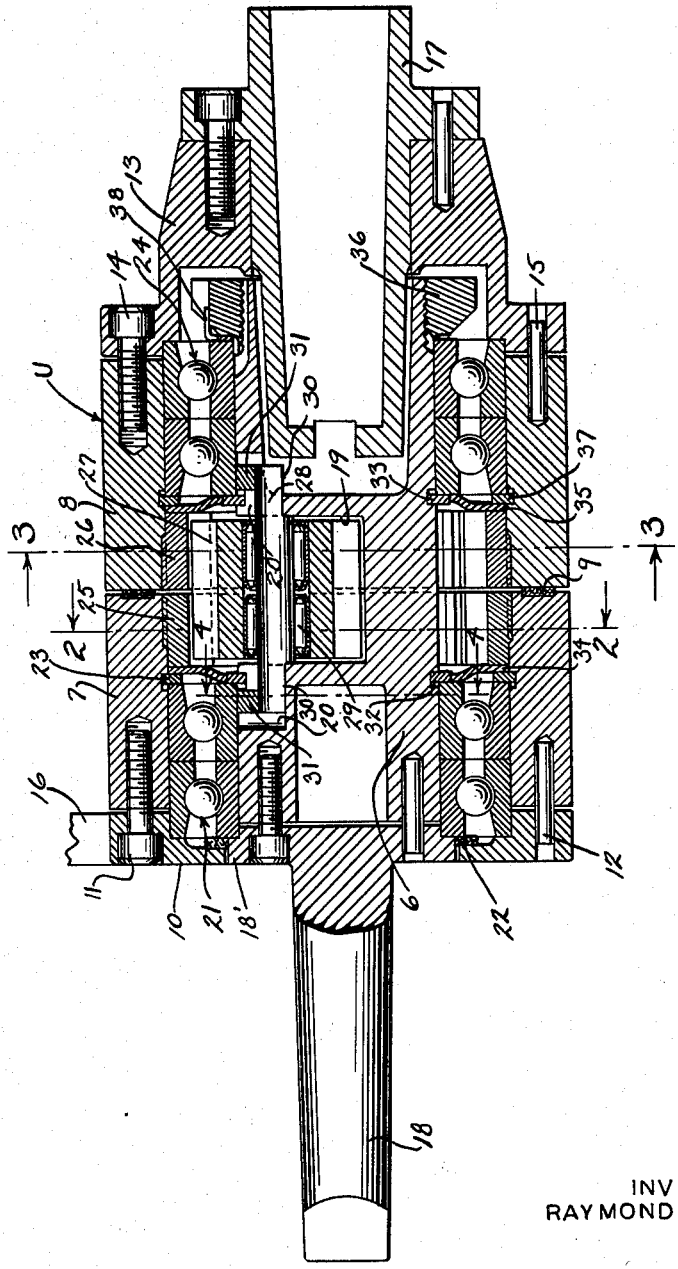
Figure 1 is a central longitudinal sectional view through my novel speed reduction unit, the section being taken on the line 1—1 of Figure 2, looking in the direction of the arrows.

Figure 3 is a diametrical sectional view taken on the line 3—3 of Figure 1, looking in the direction of the arrows, the view showing more particularly the aft annular gear and the engagement of the pinion therewith, and Figure 4 is a detail fragmentary sectional view taken on the line 4—4 of Figure 1, looking in the direction of the arrows and illustrating more particularly the mounting of the pinion shaft in the central body.

Referring to the drawings in detail, wherein similar reference characters designate corresponding parts throughout the several views, the letter U generally indicates my speed reduction unit, and the same consists of sections 7 and 8, having rotatably carried therein a body 6. The section 8 is rotatable relative to the section 7, but as illustrated, the sections 7 and 8 are concentrically arranged. A suitable felt washer or the like 9 is interposed between these sections. Secured to the outer end of the section 7 is a head ring 10. Cap screws 11 and pins 12 can be utilized for connecting the head ring 10 to the section 7. Connected to the outer end of the section 8 is a head 13 and cap screws 14 and pins 15 can be utilized for connecting the head 13 with the section 8. The section 7 and its head ring 10 are held against rotation in any desired manner, such as by the use of a handle 16 fastened to head ring 10. The head 13 can carry the output shaft or an axially disposed socket 17, as shown in the present instance. Thus, any desired type of tool, such as a drill can be associated with the socket. Rigidly secured to the inner end of the body 6 is an input shaft 18 and this shaft rotatably extends through the head ring 10. The input shaft 18 and the socket 17 are axially aligned.

The opposite ends of the body 6 are preferably provided with axially disposed cavities to lighten the weight and shorten the unit, and as best shown in Figure 1, the socket 17 extends into the forward cavity. The outer surface of the body 6 is of a general cylindrical shape, and this body at a point intermediate its ends is milled out to provide a pocket or space 19 and seats 20 at the opposite sides of the pocket. The pocket 19 and the seats 20 all open out through the outer surface of the body 6. To rotatably support the body 6 within the section 7, I employ a bearing 21, having two separate and matched back to back anti-friction bearings. The inner race rings of the bearing fit snugly on the outer surface of the body 6 and the outer race rings fit snugly against the inner surface of the section 7. The outer bearing race rings are held between the retainer ring 23 and the head ring 10. The inner bearing race rings are held between a retainer ring 32 and a flange 18' on the input shaft. A suitable felt seal or the like 22 is interposed between the head ring 10 and the adjacent bearing inner race.

The section 8 is rotatably supported in a similar manner from the body 6 with a similar bearing 24 interposed between the section 8 and the body 6. The outer race rings of the bearing 24 are held between the head 13 and a retainer ring 37. The inner race rings are held between a retainer ring 33 and a washer 38 with a nut 36.

Hence, the body 6 with its input shaft 18 is freely rotatable within the sections 7 and 8, and the sections are located with respect to each other and the body.

The adjacent faces of the sections 7 and 8 have pressed rigidly into them, annular gears 25 and 26, which have their outer peripheral surfaces partially serrated or knurled. The annular gear 25 in the present instance, is provided with 19 teeth, while the annular gear 26 is provided with 20 teeth. This tooth differential forms means of speed reduction.

Rotatable with the body 6 is a pinion 27 and this pinion is in constant mesh with the annular gears 25 and 26. The pinion 27 may have any suitable number of teeth, but in the present instance, 10 teeth have been shown. The pinion 27 is rotatably mounted on a shaft 28 by the use of bearings 29, of the roller type, and the pinion partially fits within the pocket 19. The terminals of the shaft 28 are received within the seats 20. The outer ends of the shaft 28 which are received within the seats 20 are flattened, as at 30, to prevent turning and to axially locate shaft 28 and the shaft terminals are retained in the seats by blocks 31. This pinion shaft with the body arrangement is an important part of my invention.

With this speed reduction unit, when the input shaft 18 is rotated clockwise and section 7 is held stationary (by hand, lever or clamp), the companion section 8 is forced to revolve at a reduced rotary speed and in the same direction as the input shaft. If section 8 is held stationary and the input shaft is rotated clockwise, the companion section 7 will rotate in a counterclockwise direction. This holds true in each case provided the section 7 has one less tooth in its annular gear than the gear in section 8. The direction of rotation relative to the input shaft 18 can be reversed if the gear in section 8 has one tooth less than the gear in companion section 7. If the sections are rotated by the input shaft and allowed to rotate under torque loads then they both will rotate in opposite directions relative to each other.

In this instance a 20:1 ratio between the rotated body and the section having the 20 tooth gear is had when the section having the 19 tooth gear is held stationary. If both sections rotatae relatively to each other and in opposite directions at equal rotary speed, then there is a 40:1 ratio.

The teeth of the gears 25, 26 and 27 are all of the same involute type and pitch, and of course, the pinion is of such a width that the same bridges and engages the annular gears 25 and 26. The retainer rings 32 and 33 are snapped into grooves formed in the outer surface of the body 6 and function to hold the blocks 31 in place and to retain the bearings 21 and 24 in place. An annular shield 34 is interposed between the bearing 21 and the annular gear 25 and a shield 35 is interposed between the bearing 24 and the annular gear 26. The shields 34 and 35, are, therefore, disposed on each side of the pinion 27. Actually, these shields divide the unit into three compartments, namely, a compartment for the bearing 21, a compartment for the bearing 24 and a compartment for the gears. Thus, the desired type of lubricant is retained in its compartment.

In the assembly of the unit, it might be noted that the section 7, the head ring 10, with the seal 22, the bearing 21 and the body 6, are coupled together after gear 25, shield 34 and the retaining rings 23 and 32 are in place. It is to be understood that the pinion 27 with bearings 29 and the block 31 with the shaft 28 have already been assembled on the body 6. After similar assembly of section 8 with gear 26, shield 35, retainer rings 33 and 37, bearing 24, seal 9, block 31 and washer 38, the nut 36 is tightened and locked by means of the washer 38. The input shaft 18 can now be coupled with the body 6 and head 13 with the section 8. This holds all of the mentioned parts in assembled condition.

As illustrated, the socket 17 is removable from the head 13 without disrupting the unit, so that different types of sockets or the like can be associated with the head. The input shaft 18 can also be removed from the body 6 without disturbing any other parts of the unit.

Now considering that the section 7 is held stationary, and the input shaft 18 is driven, then the pinion 27 intermeshing with both annular gears rolls around and is rotated thereby. The rotation of the pinion in turn causes rotation of the sections relative to each other and the body. The gears are so constructed that the teeth thereof have a pressure angle to suit the number of teeth employed on the gears for proper tooth action. This epicyclic gearing can have helical teeth. It is also to be again noted that the shields 34 and 35 divide the inside of the in-line speed reducer unit into separate compartments for lubricant retention.

A broad visualization of this speed reduction unit reveals that it comprises three principal structural features, namely:

(1) The two rotatable sections 7 and 8.
(2) The body 6 rotatable in these sections.
(3) Means for transmitting rotary power (through gearing) from the body 6 to either one or both of these sections 7 and 8.

From the foregoing description, it can be seen that I have provided an exceptionally simple and compact in-line speed reduction unit embodying a minimum number of essential parts for good performance.

While I have shown only the preferred form of my invention, I wish to have it understood that various changes or modifications may be made within the scope of the claims hereto attached, without departing from the spirit of the invention.

What I claim as new is:

1. A speed reducer comprising front and aft sections having an annular cylindrical shape, axially aligned and adjacent to each other, annular gears having a one tooth differential secured in the inner peripheral surfaces and adjacent ends of said sections, a body having axially disposed cavities at each end, axially disposed in said sections, front and aft bearings rotatably mounting said body in said sections, retainer rings carried by the sections and the body locating said bearings in said sections and on said body, a head ring carried by the front section securing and enclosing said bearing in the front section, a head carried by the aft section securing and enclosing said bearing in said aft section, an input shaft having an integral flange, axially and concentrically secured to said body, said input shaft securing and locating said front bearing on said body, a nut securing and locating said aft bearing, a lock washer, locking said nut to said body, a handle radially extending and secured to said head ring, a socket axially and concentrically secured to said head and extending into cavity of said body, and a pinion rotatably mounted in said body and intermeshing with said annular gears and between said bearings.

2. A speed reducer as defined in claim 1, a shaft secured to said body and rotatable with the body, said pinion rotatably carried by said shaft, said body having a pocket for said pinion and seats communicating with the pocket for said shaft, a bearing rotatably mounting said pinion on said shaft and blocks securing ends of said shaft against rotation and displacement.

3. A speed reducer as defined in claim 2, an annular shield on each side of said annular gears and said pinion, and seals for lubricant retention.

4. A speed reducer comprising front and aft sections having an annular cylindrical shape, axially aligned and adjacent to each other, said front section being stationary for mounting speed reducer, annular gears having a one tooth differential secured in the inner peripheral surfaces and adjacent ends of said sections, a body having axially disposed cavities at each end, axially placed in said sections, front and aft bearings rotatably mounting said body in said sections, retainer rings carried by the said sections and body locating said bearings in said sections and on said body, a head ring securing and enclosing said bearing in the front section, a head securing and enclosing said bearing in the aft section, an input shaft having an integral flange, axially and concentrically secured to said body, said input shaft securing and locating the front bearing on said body, a nut securing and locating the aft bearing, a lock washer, locking said nut to said body, a socket axially and concentrically secured to said head and extending into cavity of said body and a pinion rotatably mounted in said body and intermeshing with said annular gears and between said bearings.

5. A speed reducer as defined in claim 4, a shaft secured to said body and rotatable with the body, said pinion rotatably carried by said shaft, said body having a pocket for said pinion and seats communicating with the pocket for said shaft, a bearing rotatably mounting said pinion on said shaft and blocks securing ends of said shaft against rotation and displacement.

6. A speed reducer as defined in claim 5, an annular shield on each side of said annular gears and said pinion, and seals for lubricant retention.

7. A speed reducer comprising front and aft sections, axially and longitudinally aligned, rotatable relative to each other, annular gears in the adjacent ends of the sections and exposed within said sections, a body centrally disposed in said sections, front and aft bearings rotatably mounting said front and aft sections with said annular gears on said body, retainer rings carried by the sections and the body locating said bearings in said sections and on said body, a head ring securing and enclosing said front bearing in said front section, a head carried by the aft section securing and enclosing said aft bearing in the aft section, said head having a hole concentric and in axial alignment with said aft section, a pinion rotatably mounted in said body and intermeshing with said annular gears and between said front and aft bearings, said gearing having a tooth differential and said body being coupled to a driving power source.

8. A speed reducer comprising a body of cylindrical shape, sections of tubular shape coaxial to each other and rotatably, concentrically and independently mounted and carried on said body, annular gears respectively secured in said sections, a pinion in constant mesh with said annular gears rotatably mounted and eccentrically aligned with said body and carried in said body, means for coupling the body to a fast rotary power source, the said annular gears and said pinion being such that, the same relative rotary speed reduction is obtained between said body and either of said sections, and means for the utilization of slow rotary power from the sections.

9. A speed reducer comprising a body of cylindrical shape, sections of tubular shape coaxial to each other and rotatably, concentrically and independently mounted and carried on said body, annular gears respectively secured in said sections, bearings rotatably mounting said sections on said body, a pinion in constant mesh with said annular gears rotatably mounted and eccentrically aligned with said body and carried in said body, means for coupling said body to a fast rotary power source, a shaft rotatably mounting said pinion in said body, said body having a pocket receiving said pinion and seats communicating with the pocket receiving the ends of said shaft, said bearings adjacent to said pinion enclosing the seats for securing the ends of said shaft, said annular gears having a tooth differential, and means for the utilization of slow rotary power from the sections.

References Cited in the file of this patent

UNITED STATES PATENTS

| | | |
|---|---|---|
| 810,444 | Theil | Jan. 23, 1906 |
| 850,597 | McCanna | Apr. 16, 1907 |
| 874,852 | Lorenz | Dec. 24, 1907 |
| 2,780,944 | Ondeck | Feb. 12, 1957 |